United States Patent [19]
Saroya

[11] Patent Number: 5,331,138
[45] Date of Patent: Jul. 19, 1994

[54] HYBRID CARD READER

[75] Inventor: Jagtar S. Saroya, San Pedro, Calif.

[73] Assignee: American Magnetics Corp., Carson, Calif.

[21] Appl. No.: 971,190

[22] Filed: Nov. 3, 1992

[51] Int. Cl.$^5$ .............................................. G06K 7/08
[52] U.S. Cl. ................................... 235/449; 235/438; 235/492
[58] Field of Search ...................... 235/438, 449, 492

[56] References Cited

U.S. PATENT DOCUMENTS 4,007,355  2/1977  Moreno .............................. 235/438
4,404,464  9/1983  Moreno .............................. 235/438

*Primary Examiner*—Harold Pitts
*Attorney, Agent, or Firm*—Herbert M. Shapiro

[57] ABSTRACT

A hybrid reader for smart cards and magnetic stripe cards includes a selective lock mechanism for only smart cards. The mechanism is responsive to the establishment of electrical contacts between the reader and the smart card for activating a latch mechanism. The mechanism is not responsive to the proper seating of a card in the reader or to the presence of only a magnetic stripe card and requires a greater amount of energy to capture a smart card than is required to release the card.

8 Claims, 3 Drawing Sheets

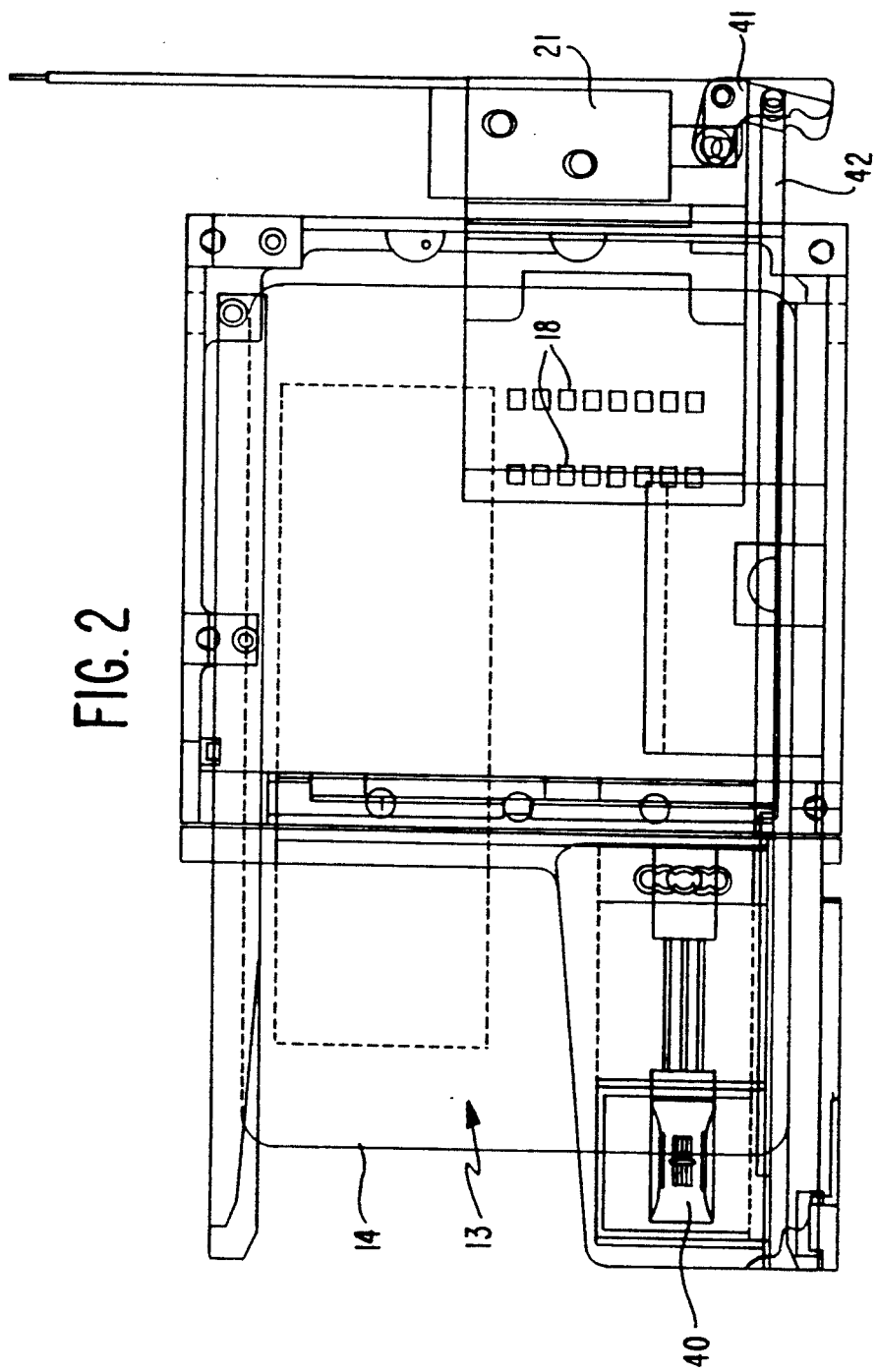

HYBRID CARD READER

FIELD OF THE INVENTION

This invention relates to readers of a variety of different cards used in commercial transactions, cards such as smart cards, optical character cards, and magnetic stripe cards.

BACKGROUND OF THE INVENTION

Smart cards, checks with optical characters and magnetic stripe cards are in widespread use. The readers for these cards, of course, also are in widespread use. The ubiquitous magnetic stripe reader includes a slot into which a card is moved, for example, by hand past a read (and possibly write head) to obtain the user and bank identification number.

The smart card contains a microprocessor chip and memory and is capable of storing a far greater amount of information about participants in a commercial transaction. But the reader for such a card is more complicated and requires that electrical contacts be made between the reader and electrodes on the card.

Recently, readers have appeared which are capable of reading both types of cards. The most familiar of these readers is of the insert type where a card is inserted into a slot where it resides during the transaction. The reader is capable of responding to the insertion of the card to ascertain the information recorded there. In one instance, electrical contacts are pressed against an inserted card in positions to contact electrodes on the card if such electrodes are present. If no electrodes are present, of course, no contact is made and the positions of the contacts are irrelevant. The reader also has a magnetic head positioned to read a magnetic stripe if it is present. If a card is both a smart card and a magnetic stripe card, the reader has the capacity to read information from both recording systems and to relay information to a controller or computer.

· It is to be noted that magnetic stripe information is captured by moving a card with respect to a read head whereas information is obtained from a smart card over time while the card is maintained in a secure position. Consequently, a smart card presently is locked in position by a resident locking device while a magnetic stripe card is positioned under user control and not captured. A resident locking device has been found inadequate to seat the smart card for proper operation thus leading to data errors.

BRIEF DESCRIPTION OF AN ILLUSTRATIVE EMBODIMENT OF THIS INVENTION

In accordance with the principles of the present invention, a hybrid card reader includes a selective lock for capturing only a smart card. The magnetic stripe card is not captured and can be removed under operator control at any time. The selective lock mechanism is responsive to the insertion of a card into the insert reader when a set of contacts physically contacts electrodes on the card. A signal generated in response to the insertion of a card notifies a controller that a card is present. The controller activates power to the contact and, if the electrodes are present, at this time, activates a latch mechanism to capture the card. An end-of-transaction signal releases the latch.

BRIEF DESCRIPTION OF THE DRAWING

FIGS. 2 and 3 are schematic top and side views of the reader of FIG. 1, respectively, with the enclosure removed.

DETAILED DESCRIPTION OF AN ILLUSTRATED EMBODIMENT OF THIS INVENTION

Figure 1:
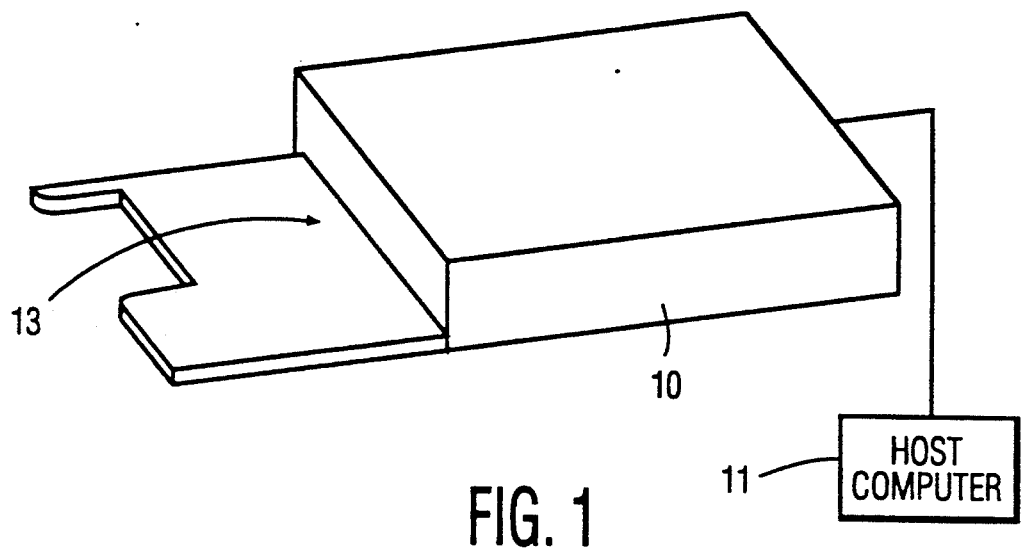
FIG. 1 is a plan view of a hybrid card reader in accordance with the principles of this invention.
Figure 4:
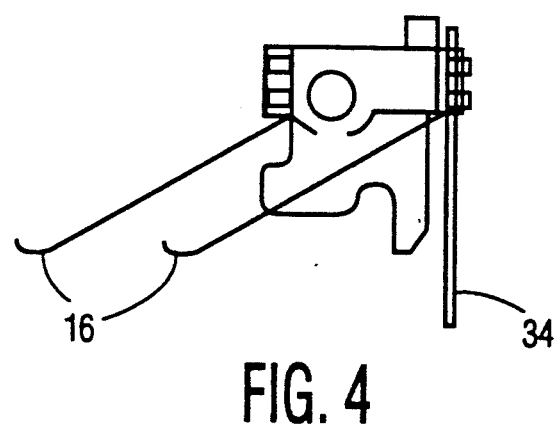
FIG. 4 is a schematic view of a portion of the reader of FIGS. 1 and 2 showing the contact assembly for smart cards.

FIG. 1 shows a hybrid smart card and magnetic card reader 10 in accordance with the principles of this invention. The reader is connected to a host computer 11 which is signalled that a card is in place in the reader as will become clear hereinafter.

FIG. 1 specifically shows an insert reader 10 including an opening at 13 for receiving a magnetic card or a smart card, the latter having a plurality of electrodes thereon as is well known.

FIG. 2 shows a schematic top view of the components of the reader of FIG. 1. The figure also shows a smart card 14 in place within the reader. The distal end of the card is supported by support 15 of FIG. 3 which acts as a bearing surface when the card is inserted and contact fingers 16 contact the electrodes (18) on the card.

Figure 3:
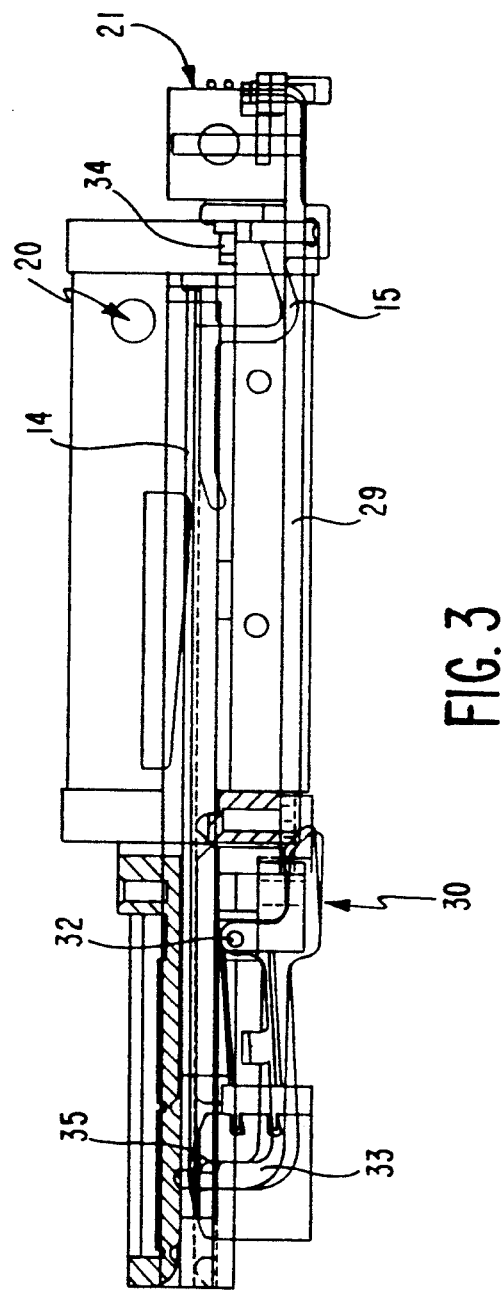

The reader includes a sensor 20, of FIG. 3, which senses the presence of a card. The sensor is operative to signal a host computer or controller (11) of the presence of a card. The host supplies power to the reader and interrogates the reader to determine if contacts to electrodes are made. If contacts are made, the host signals solenoid 21 to lock the card in place.

Solenoid 21 operates a cam rod pushing against a pivoting latching arrangement. The latching arrangement includes a hook which engages the proximal edge of a card. The cam rod is designated 29 in FIG. 3 and communicates with a pivoting member 30. Member 30 rotates about pivot 32 to move hook 33 to engage a card edge.

The latching arrangement also is operative to move a card further into the reader. Such movement is only slight causing the distal edge of the reader to engage a switch 34, shown in FIG. 3. Switch 34 is operative to permit power to be supplied to the contact fingers from a power supply (not shown) and to effect relative movement of the contact fingers and the electrodes to ensure that low impedance connection is achieved.

The latching arrangement has the property that it takes more energy to latch than to open in the event of a power failure. As a manual override, a user exerting a force of five pounds can withdraw the card even if the hook is engaging the card edge. To permit such an extraction, hook 33 has a ramped edge 35 along which the proximal edge of a card rides forcing the hook downward as shown. The solenoid is reset by such forced movement.

What is claimed is:

1. A hybrid card reader for data in a magnetic stripe card and in a smart card selectively, including thereon electrodes for making electrical contact thereto, said reader including contacts for engaging said electrodes and means responsive to the presence of a card for providing a first signal for signalling the presence of a smart card to a host controller, said reader also including a latching mechanism responsive to a signal from said host controller for locking said card in position for the duration of a transaction, said host controller being responsive to said first signal for interogating said reader as to the presence of said electrodes and for activating said latch if electrodes are present.

2. A reader as set forth in claim 1 also including means for releasing said card at the end of said transaction.

3. A reader as set forth in claim 2 wherein said latching mechanism comprises a pivoting hook for engaging the proximal edge of said card and a solenoid for pivoting said hook to engage and to disengage said proximal edge in response to first and second signals from said controller.

4. A reader as set forth in claim 3 wherein said hook includes a ramp edge for engaging the proximal edge of said card and said solenoid is of a type to permit the movement of said hook when said ramp edge is engaged by a card being forcibly withdrawn by a user.

5. A reader as set forth in 1 also including a magnetic read head for reading a magnetic stripe on a card.

6. A reader as set forth in claim 4 including a magnetic read head for reading a magnetic stripe on a card.

7. A reader as set forth in claim 1 wherein said latching mechanism is operative to shift said card slightly in the direction of said dital end for ensuring that good contact is made between said electrodes and said contacts.

8. A reader as set sorth in claim 3 wherein said latching mechanism requires greater energy to engage the proximal edge of said card than to disengage said card.

* * * * *